(12) United States Patent
Tominaga et al.

(10) Patent No.: US 6,938,816 B2
(45) Date of Patent: Sep. 6, 2005

(54) METHODS OF MANUFACTURING DIFFUSION BONDED PRODUCTS AND PRODUCTS MANUFACTURED BY SUCH METHODS

(75) Inventors: Tadayoshi Tominaga, Aichi-ken (JP); Takio Suzuki, Aichi-ken (JP)

(73) Assignee: Asian Kogyo Kabushiki Kaisha, Aichi-ken (JP)

( * ) Notice: Subject to any disclaimer, the term of this patent is extended or adjusted under 35 U.S.C. 154(b) by 41 days.

(21) Appl. No.: 10/463,518

(22) Filed: Jun. 18, 2003

(65) Prior Publication Data

US 2003/0234278 A1 Dec. 25, 2003

(30) Foreign Application Priority Data

Jun. 21, 2002 (JP) .................................... 2002-181777

(51) Int. Cl.[7] .............................................. B23K 28/00
(52) U.S. Cl. .................. 228/193; 228/173.2; 228/173.5
(58) Field of Search ................................ 228/193–196, 228/173.1, 173.2, 173.5

(56) References Cited

U.S. PATENT DOCUMENTS

| | | | | |
|---|---|---|---|---|
| 4,119,261 A | * | 10/1978 | Devine, Jr. | 228/113 |
| 4,129,241 A | * | 12/1978 | Devine, Jr. | 228/113 |
| 4,603,801 A | * | 8/1986 | Wan et al. | 228/194 |
| 4,763,876 A | * | 8/1988 | Oda et al. | 251/359 |
| 5,145,105 A | * | 9/1992 | Floroski et al. | 228/194 |
| 5,230,308 A | * | 7/1993 | Gauthier et al. | 123/90.55 |
| 5,426,343 A | * | 6/1995 | Rhodes et al. | 313/623 |
| 5,435,286 A | * | 7/1995 | Carroll, III et al. | 123/508 |
| 5,770,322 A | * | 6/1998 | Nishioka et al. | 428/627 |
| 6,009,843 A | * | 1/2000 | Griffin et al. | 123/188.3 |
| 6,085,714 A | * | 7/2000 | Wilson et al. | 123/188.3 |
| 6,120,727 A | * | 9/2000 | Asaka et al. | 419/6 |
| 6,180,183 B1 | * | 1/2001 | Wentland et al. | 427/431 |
| 6,226,866 B1 | * | 5/2001 | Wilson et al. | 29/888.45 |
| 6,419,147 B1 | * | 7/2002 | Daniel | 228/194 |
| 6,667,527 B2 | * | 12/2003 | Lue et al. | 257/467 |
| 2003/0209773 A1 | * | 11/2003 | Lue et al. | 257/467 |
| 2003/0234278 A1 | * | 12/2003 | Tominaga et al. | 228/193 |

FOREIGN PATENT DOCUMENTS

| | | |
|---|---|---|
| JP | 02089535 | 3/1990 |
| JP | 2000129313 | 5/2000 |

* cited by examiner

*Primary Examiner*—Kiley S. Stoner
(74) *Attorney, Agent, or Firm*—Dennison, Schultz, Dougherty & MacDonald

(57) ABSTRACT

A method is provided for diffusion bonding a first member (20) and a second member (3) to each other. According to this method, a first joint portion (24) of the first member and a second joint portion (34) of the second member are fitted to each other with a predetermined interference. Thereafter, the first and second members are heated under a condition substantially without oxygen, so that the first and second joint portions are diffusion bonded to each other.

27 Claims, 6 Drawing Sheets

FORGING →

CUTTING DRILLING →

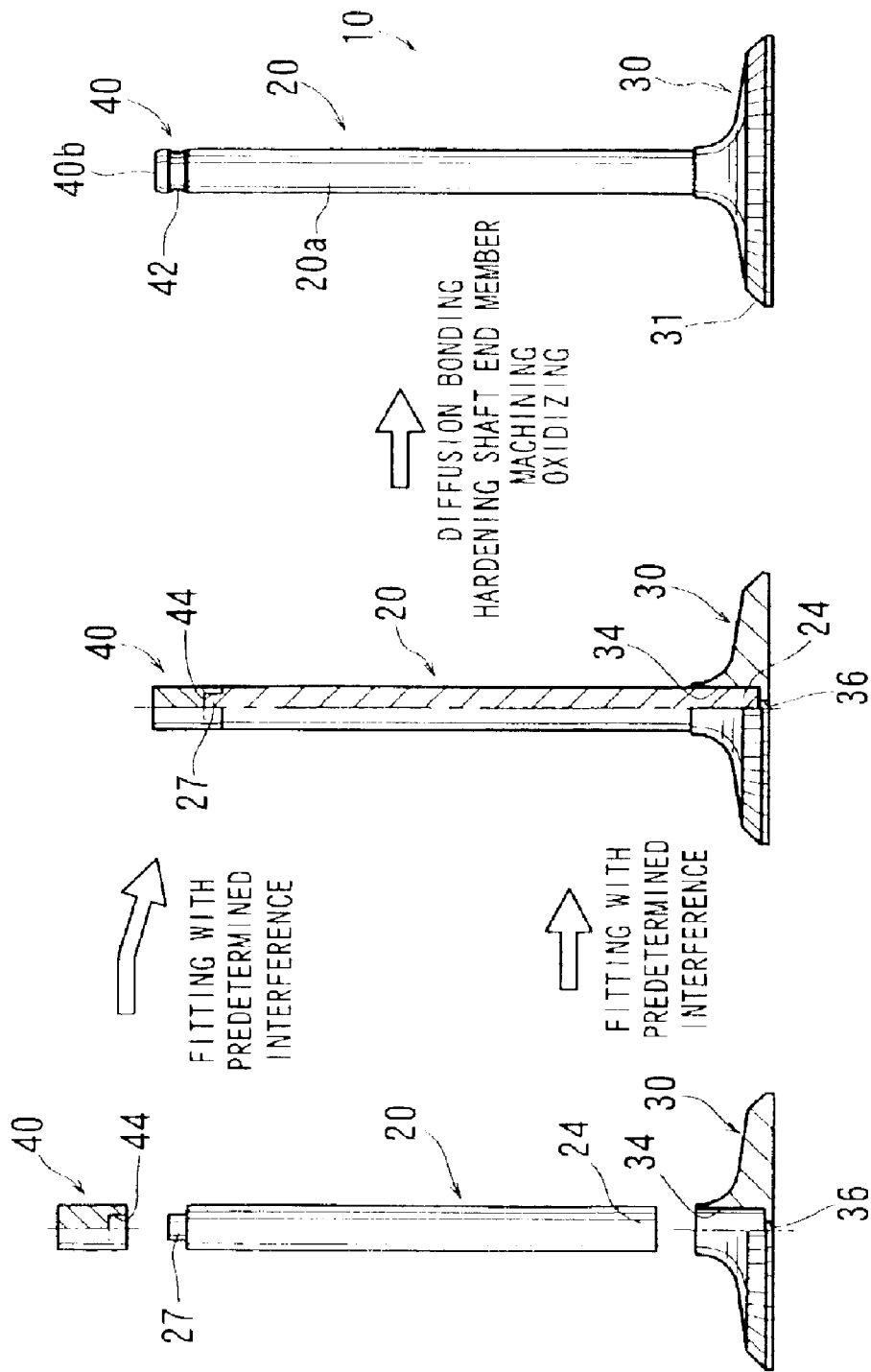

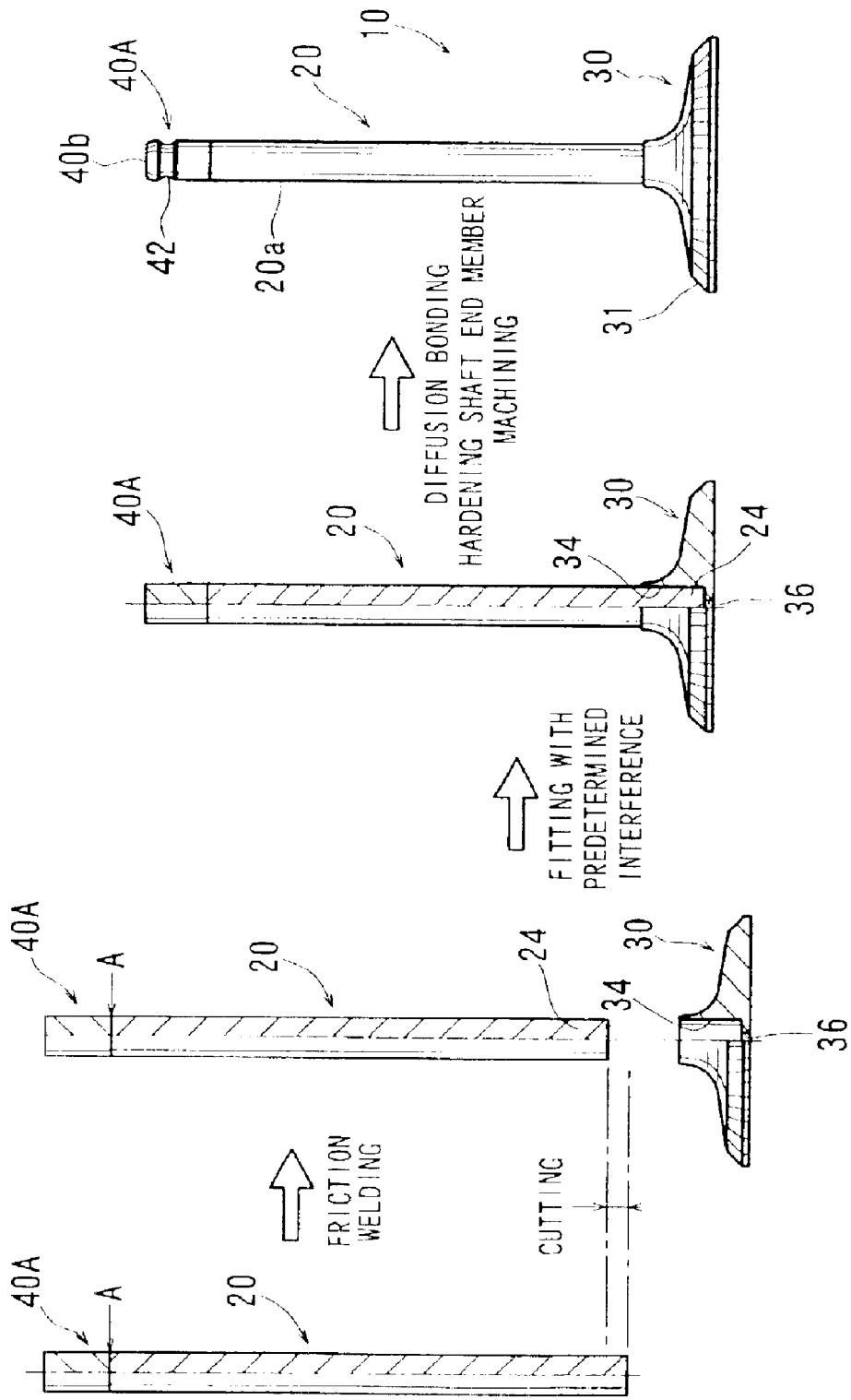

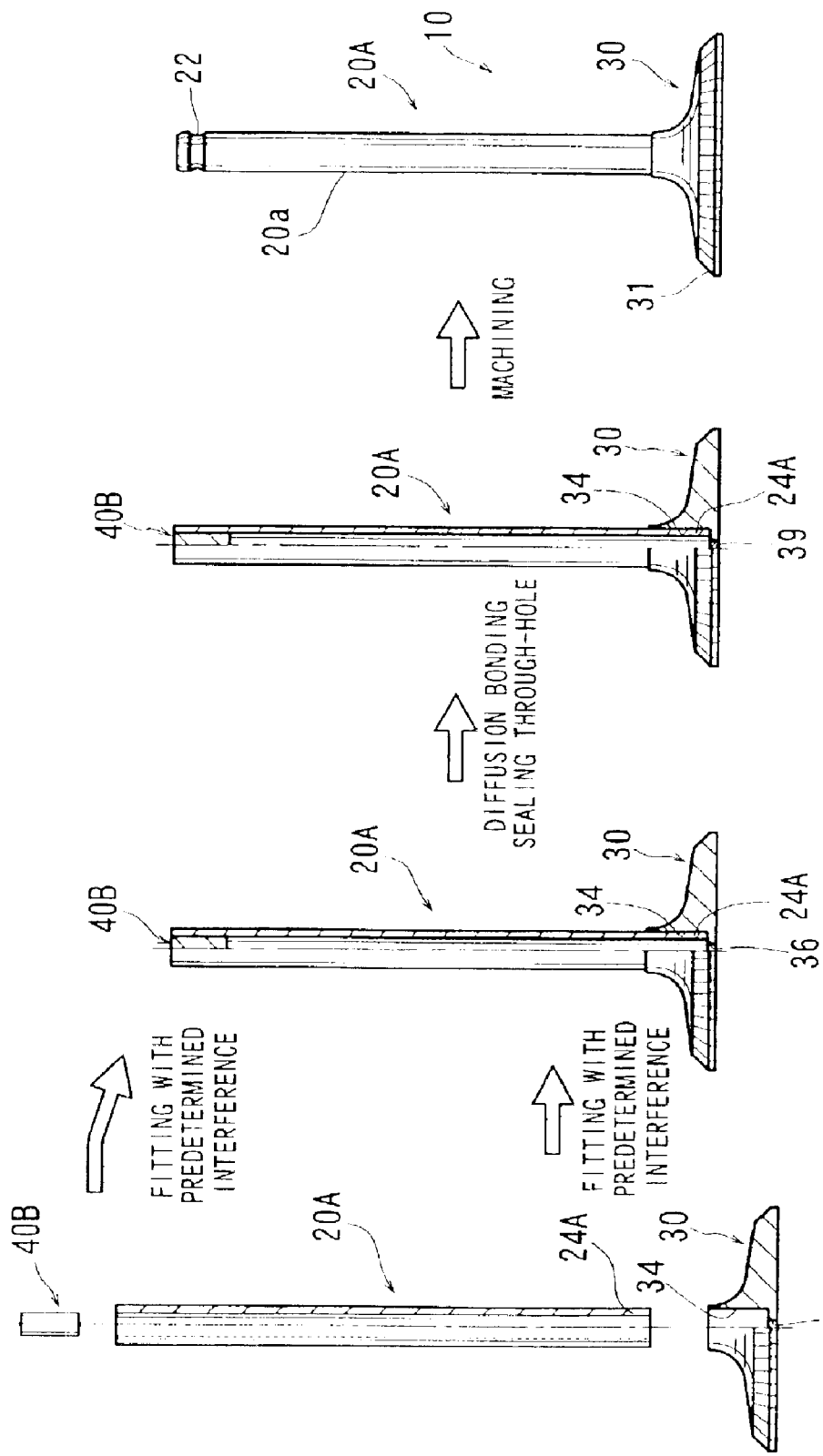

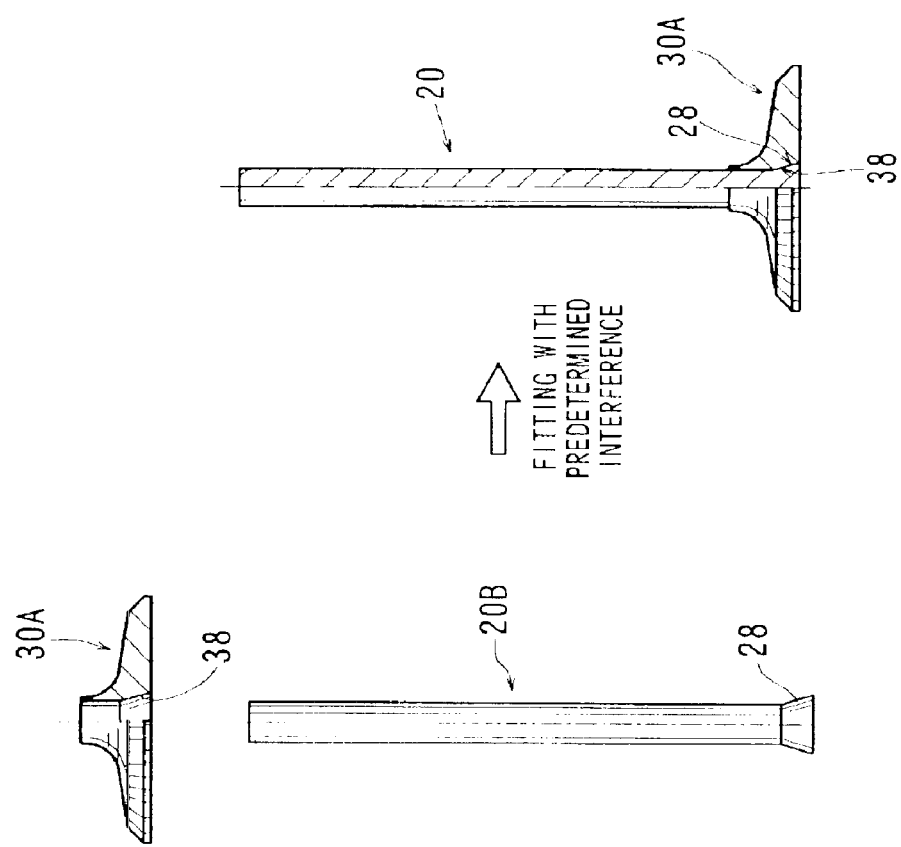

METHODS OF MANUFACTURING DIFFUSION BONDED PRODUCTS AND PRODUCTS MANUFACTURED BY SUCH METHODS

This application claims priority to Japanese patent application serial number 2002-181777, the contents of which are incorporated herein by reference.

BACKGROUND OF THE INVENTION

1. Field of the Invention

The present invention relates to methods of manufacturing diffusion bonded products, e.g. engine valves. The present invention also relates to products manufactured by such methods.

2. Description of the Related Art

Japanese Laid-Open Patent Publication No. 2-89535 teaches a method of manufacturing a titanium based engine valve by using a diffusion bonding technique. In the method of this publication, a valve head and a valve shaft are diffusion bonded to each other by treating these parts with heat within a vacuum furnace, while the valve head and the valve shaft are pressed against each other by a predetermined pressure by means of a hot press machine that is disposed within the vacuum furnace.

According to the method of this publication, in order to press a valve head and a valve shaft against each other within a vacuum furnace, a large-scaled hot press machine must be accommodated within the vacuum furnace. Therefore, the efficiency of the process for diffusion bonding was relatively low, so that the manufacturing costs have been increased.

SUMMARY OF THE INVENTION

It is accordingly an object of the present invention to teach improved methods that can improve the efficiency of manufacturing diffusion bonded products and that can reduce manufacturing costs of the diffusion bonded products.

According to one aspect of the present teachings, methods of diffusion bonding a first member and a second member to each other are taught. For example, the first member and the second member may be parts of an engine valve of an internal combustion engine or may be parts of a locker arm that cooperates with the engine valve. The methods may comprise fitting a first joint portion of the first member and a second joint portion of the second member to each other with a predetermined interference, and thereafter heating the first and second members under a condition substantially without oxygen, so that the joint portions are diffusion bonded to each other.

Therefore, it is not necessary to press the first member and the second member against each other during the operation for diffusion bonding by heat. As a result, the efficiency for manufacturing diffusion bonded products can be improved and the manufacturing costs can be reduced.

The fist member and the second member may be made of materials that can be diffusion bonded to each other. For example, the materials of the first and second members may be selected from titanium-based materials, steel, ceramic and combinations of these materials. In particular, the methods can be advantageously used for diffusion bonding the first and second member that are made of titanium-based materials, so that diffusion bonded products made of titanium-based materials and having relatively complicated configurations can be manufactured.

In this specification, the term "titanium-based material" may include pure titanium and titanium alloy, e.g., Ti-6Al-4V (known as "Ti64"), Ti-6Al-2Sn-4Zr-2Mo, Ti-3Al-2,5V, Ti-6Al-4Sn-4Zr, Ti-6Al-2Fe and Ti-6Al-2Sn-4Zr-6Mo. The steel may preferably be SH11.

According to another aspect of the present teachings, the first member and the second member may include joint portions that are adapted to be diffusion bonded to each other. Preferably, the joint portion of the first member may be a convex portion (male portion), e.g., a projection and an extension. The joint portion of the second member may be a concave portion (female portion), e.g., a hole or a recess, that is configured to conform to the configuration of the convex portion, so that the joint portions can be fitted to each other while the joint portions closely contact with each other.

According to another aspect of the present teachings, the joint portions may be press fitted or shrink fitted or expansion fitted by utilizing heat.

According to another aspect of the present teachings, diffusion bonded products manufactured by the above methods are taught.

According to another aspect of the present teachings, the first member may be a valve shaft and the second member may be a valve head of an engine valve that may be used for engines, in particular, internal combustion engines.

According to another aspect of the present teachings, a shaft end member may be joined to the valve shaft.

According to another aspect of the present teachings, the shaft end member also may be made of material that can be diffusion bonded to the valve shaft. Preferably, the shaft end member may be diffusion bonded to the valve shaft by using the same methods for diffusion bonding the valve shaft and the valve head to each other, so that the shaft end member may be diffusion bonded to the valve shaft at the same time that the valve shaft and the valve head are joined to each other.

According to another aspect of the preset teachings, the shaft end member may be treated to have an improved wear resistance.

According to another aspect of the present teachings, the valve shaft may have a tubular configuration, so that the engine valve may be light-weight.

According to another aspect of the present teachings, the methods may further include cutting the valve shaft to a predetermined length with reference to a joint point between the valve shaft and the shaft end portion. Therefore, the position of the joint point relative to the valve head may be accurately determined. Thus, the cut end of the valve shaft may be adapted to be joined to the valve head.

According to another aspect of the present teachings, engine valves manufactured by the above methods are taught.

BRIEF DESCRIPTION OF THE DRAWINGS

FIGS. 3(A), 3(B) and 3(C) are views showing steps of a second representative method of manufacturing an engine valve;

FIGS. 4(A) to 4(D) are views showing steps of a third representative method of manufacturing an engine valve;

FIGS. 5(A) to 5(D) are views showing steps of a fourth representative method of manufacturing an engine valve; and FIGS. 6(A) and 6(B) are views showing an alternative process of fitting a valve shaft and a valve head to each other.

DETAILED DESCRIPTION OF THE INVENTION

Figure 1:
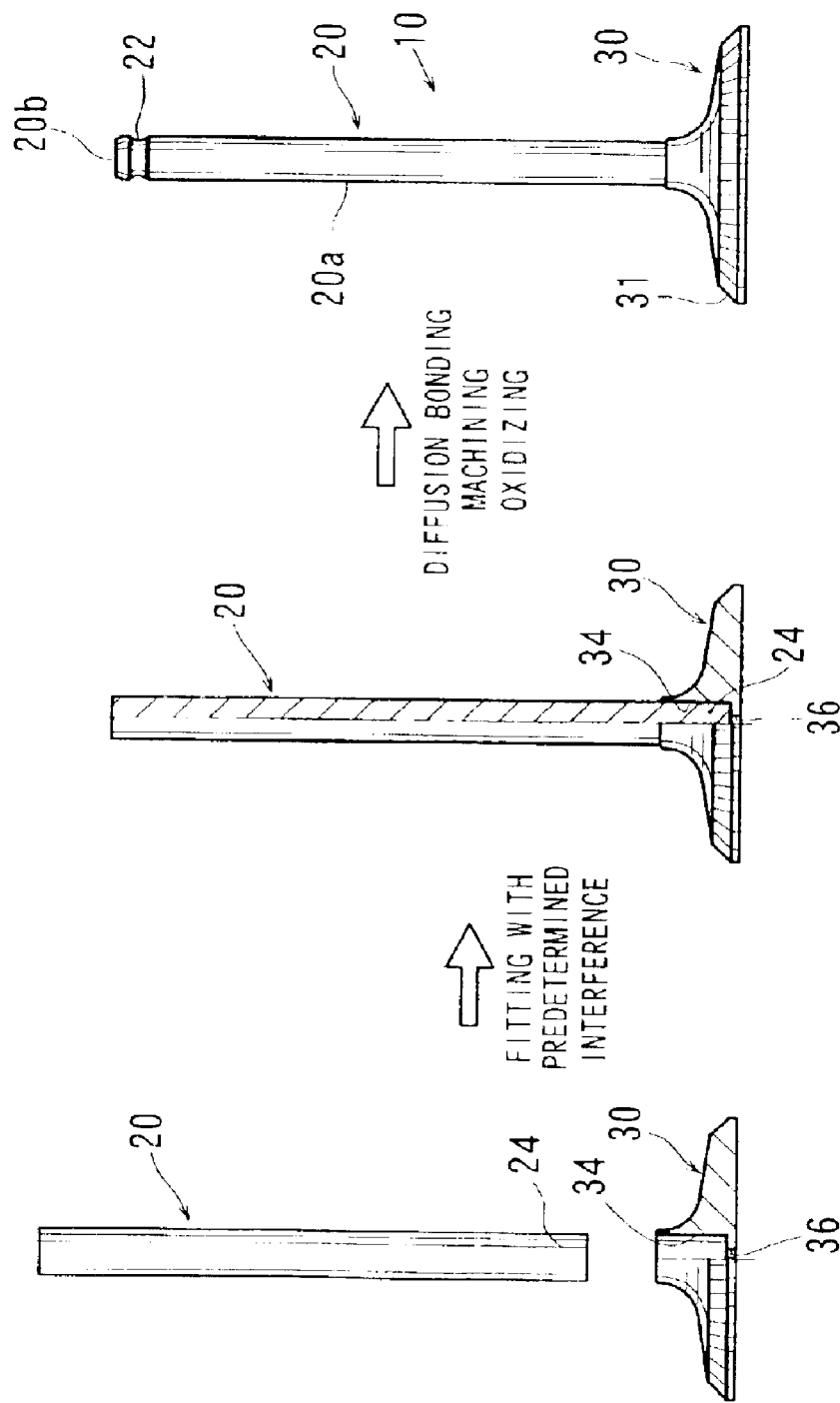
FIGS. 1(A), 1(B) and 1(C) are views showing steps of a first representative method of manufacturing an engine valve.

In one embodiment of the present teachings, methods of diffusion bonding a valve shaft and a valve head are taught. Preferably, one of the valve shaft and the valve head may be made of titanium based material. The other of the valve shaft and the valve shaft may be made of material that can be diffusion boned to the valve shaft and that may be chosen from titanium based material, steel and ceramic. A joint portion of the valve shaft and a corresponding joint portion of the valve head may be fitted to each other with a predetermined interference. Thereafter, the valve shaft and the valve head may be heated within a vacuum furnace, so that the joint portions are diffusion bonded to each other.

Therefore, a hot press machine is not necessary to be disposed within the vacuum furnace in order to press the valve shaft and the valve head against each other. As a result, the efficiency of manufacturing the engine valves can be improved. In addition, the engine valves can be manufactured at lower costs.

In another embodiment of the present teachings, the joint portion of the valve shaft may be an end portion of the valve shaft and the joint portion of the valve head may be a hole or a recess formed in the valve head, so that the joint portions may be press fitted or shrink fitted or expansion fitted by utilizing heat.

In another embodiment of the present teachings, engine valves are taught that are manufactured by the above methods.

In another embodiment of the present teachings, the methods further include joining a shaft end member to the valve shaft. Preferably, the shaft end member may be made of material that has high wear resistance. Otherwise, the shaft end member may be treated to improve the wear resistance. For example, if the shaft end member is made of steel, the shaft end member may be induction hardened.

In another embodiment of the present teachings, the shaft end member also may be diffusion bonded to the valve shaft. Therefore, the material of the shaft end member may be chosen from titanium-based material, steel and ceramic.

In another embodiment of the present teachings, the valve shaft may have a tubular configuration, so that the engine valve may be light weight.

In another embodiment of the present teachings, the methods may further include cutting the valve shaft to a predetermined length with reference to a joint point between the valve shaft and the shaft end portion. Therefore, the position of the joint point relative to the valve head may be accurately determined.

Each of the additional features and teachings disclosed above and below may be utilized separately or in conjunction with other features and teachings to provide improved methods of manufacturing diffusion bonded products and engine valves and to provide diffusion bonded products and engine valves manufactured by such methods. Representative examples of the present invention, which examples utilize many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A first representative method of manufacturing engine valves by utilizing a diffusion bonding technique will now be described with reference to FIGS. 1(A) to 1(C) and FIGS. 2(A) to 2(C). FIGS. 1(A) to 1(C) show steps of manufacturing a representative engine valve that is used for an internal combustion engine.

In this representative method, a valve shaft 20 and a valve head 30 may be prepared separately from each other as shown in FIG. 1(A). The valve shaft portion 20 and the valve head 30 may be joined into one-piece with each other by a diffusion bonding process as will be hereinafter described, so that an engine valve 10 can be manufactured. Thus, in this first representative method, the engine valve 10 may be a product that is manufactured by the diffusion bonding process.

Preferably, the valve shaft 20 may be formed by a round bar that is made of titanium alloy, e.g. Ti64 (Ti-6Al-4V). The round bar may be cut to form a plurality of valve shafts 20 having a predetermined length. One end 24 (lower end as viewed in FIG. 1(A)) of the valve shaft 20 may serve as a convex joint portion or a male joint portion.

Preferably, the valve head 30 may be made of titanium alloy that is the same as the material of the valve shaft 20. The valve head 30 may be manufactured by a representative process that will be hereinafter described with reference to FIGS. 2(A) to 2(C).

Figure 2:
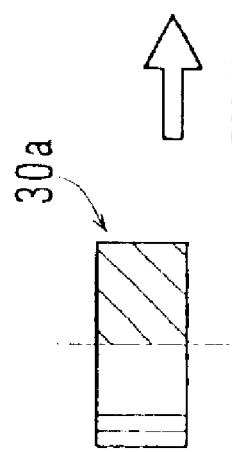
FIGS. 2(A), 2(B) and 2(C) are views showing steps of manufacturing a valve head according to the first representative method.
Figure 2:
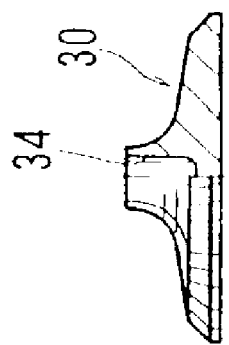
Figure 2:
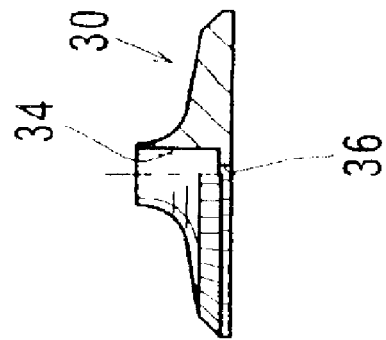

First, a round bar made of titanium alloy (not shown) may be cut to form a semi-finished product 30a for the valve head 30 as shown in FIG. 2(A). Alternatively, the semi-finish product 30a may be formed by punching a titanium alloy plate using a press machine.

Next, the semi-finished product 30a may be forged to form the valve head 30 as shown in FIG. 2(B). At the same time, a concave joint portion or a female joint portion 34 may be formed on the valve head 30.

Preferably, the inner peripheral surface of the female joint portion 34 may be finished to have a predetermined diameter by an appropriate machining tool, e.g. a drilling tool. At the same time that the female joint portion 34 is machined, a through-hole 36 may be formed in the bottom of the female joint portion 34 as shown in FIG. 2(C). Of course, the finishing machining operation may be eliminated, if the female joint portion 34 is forged with a high degree of accuracy to have a predetermined diameter. In addition, the through-hole 36 may be formed at the same time that the semi-finished product 30a is forged.

The valve head 30 may be thus formed by the above process. Although the valve head 30 is manufactured by the forging process in the above representative process, the valve head 30 may be manufactured by any other process, e.g., a cutting and drilling process. In addition, the semi-finished product 30a may be formed by a tube made of titanium alloy other than the round bar and the plate made of titanium alloy.

Thereafter, the male joint portion 24 of the valve shaft 20 may be fitted into the female joint portion 34 of the valve head 30 with a predetermined degree of interference as shown in FIG. 1(B). The male joint portion 24 and the female joint portion 34 may be interferentially fitted to each other by using a suitable fitting technique, such as a press fitting technique and a shrink or expansion fitting technique utilizing heat. If the valve head 30 is manufactured by a hot-forging process, the residual heat in the valve head 30 after the hot-forging process can be used for shrink fitting between the male joint portion 24 and the female joint portion 34 in order that the male joint portion 24 and the female joint portion 34 are fitted to each other with a predetermined degree of interference.

During the fitting operation with a predetermined degree of interference between the male joint portion 24 and the female joint portion 34, air may be confined within the female joint portion 34 by the male joint portion 24. However, such air may be rapidly discharged to the outside via the through-hole 36 formed in the valve head 30.

The valve shaft 20 and the valve head 30 fitted to each other as described above may then be heated within a vacuum furnace (not shown). The vacuum furnace also may be called "vacuum heat-treating furnace." More specifically, the valve shaft 20 and the valve head 30 may be annealed or solution-heat treated under a condition substantially free from air at a predetermined temperature, e.g., a temperature within a range of 800–1200° C., so that the male joint portion 24 of the valve shaft 20 and the female joint portion 34 of the valve head 30 may be joined to each other in a manner known as "diffusion bonding." Vacuum furnaces and processes for treating products with heat by such vacuum furnaces in order to form diffusion bonded products are well known. Therefore, an explanation will not be necessary to be made in detail.

The engine valve 10 that has been manufactured by joining the male joint portion 24 of the valve shaft 20 and the female joint portion 30 of the valve head 30 through the diffusion bonding process may then be finished in a known manner. FIG. 1(C) shows the engine valve 10 that has been finished. For example, an outer peripheral surface 20a of the valve shaft 20, a face 31 of the valve head 30, an axial end surface 20b of the valve shaft 20, and a groove 22 formed in the valve shaft 20 in a position adjacent to the axial end may be ground or polished. In addition, the engine valve 10 may be oxidized in order to improve wear resistance. The process of manufacturing the engine valve 10 may thus be completed. The groove 22 formed in the valve shaft 20 may serve to receive a cotter (not shown) for attaching the valve shaft 20 to a valve retainer of the engine.

According to the first representative method described above, because the male joint portion 24 of the valve shaft 20 and the female joint portion 34 of the valve head 30 are fitted to each other with a predetermined interference, the male joint portion 24 and the female joint portion 34 may be pressed against each other by a predetermined pressing force in the fitted state. The valve shaft 20 and the valve head 30 fitted to each other in this way may then be heated within the vacuum furnace, so that the male joint portion 24 and the female joint portion 34 may be diffusion bonded to each other to thereby form the engine valve 10. In contrast to the conventional methods, the first representative method does not require to apply pressure to the male joint portion 24 and the female joint portion 34 by means of a press machine within the vacuum furnace. Therefore, the degradation in efficiency of the manufacturing process of the engine valve 10 due to the inclusion of the pressing operation within the vacuum furnace may be avoided. As a result, the efficiency of the manufacturing process of the engine valve 10 can be improved and the manufacturing costs can be reduced.

In other words, the representative engine valve 10 can be manufactured by the above representative process that is improved in efficiency and can advantageously reduce the manufacturing costs.

A second representative method of manufacturing an engine valve will now be described with reference to FIGS. 3(A) to 3(C). The second representative method is a modification of the first representative method. Therefore, like members are given the same reference numerals as the first representative embodiment and the description of these members will not be necessary.

The second representative method is different from the first representative method in that a shaft end member 40 (see FIG. 3(A)) that is a separate member from the valve shaft 20 may be diffusion bonded to an upper end of the valve shaft 20. Preferably, the shaft end member 40 may be made of steel, e.g. SUH11. In addition, a convex joint portion or a male joint portion 27 may be formed on the upper end of the valve shaft 20 and may have the same axis as the valve shaft 20. Preferably, the male joint portion 27 may be formed at the same time as the forging process of the valve shaft 20 or may be formed by machining the valve shaft 20.

Preferably, the shaft end member 40 may have a cylindrical configuration and may have the same outer diameter as the outer diameter of the valve shaft 20. Further, the shaft end member 40 may be formed with a concave joint portion or a female joint portion 44. Preferably, the female joint portion 44 may be formed at the same time as the shaft end member 40 is forged or may be formed by machining the shaft end member 40.

The female joint portion 44 of the shaft end member 40 may be fitted to the male joint portion 27 of the valve shaft 20 with a predetermined degree of interference. Similar to the fitting between the female joint portion 34 of the valve head 30 and the male joint portion 24 of the valve shaft 20, the male joint portion 27 of the valve shaft 20 may be interferentially fitted into the female joint portion 44 of the shaft end member 40 by using a suitable fitting technique, such as a press fitting technique and a shrink or expansion fitting technique utilizing heat.

Prior to or after the fitting operation between the male joint portion 27 and the female joint portion 44, the male joint portion 24 of the valve shaft 20 and the female joint portion 34 of the valve head 30 may be fitted to each other with a predetermined interference as described in connection with the first representative method. FIG. 3(B) shows the valve shaft 20, the valve head 30 and the shaft end member 40 that have been fitted to each other.

Thereafter, in the same manner as the first representative method, the valve shaft 20, the valve head 30 and the shaft end member 40 may be heated within a vacuum furnace (not shown). As a result, the male joint portion 24 of the valve shaft 20 and the female joint portion 34 of the valve head 30 may be diffusion bonded to each other. In addition, the male joint portion 27 of the valve shaft 20 and the female joint portion 44 of the shaft end member 40 may be diffusion bonded to each other.

Preferably, a groove 42 may be formed in the shaft end member 40 in a position adjacent to an end surface 40b of the shaft end member 40. The groove 42 may serve to receive a cotter (not shown) for attaching the valve shaft 20 to a valve retainer (not shown).

Preferably, the shaft end member 40 may be hardened by a suitable hardening technique, e.g. an induction hardening technique, so that wear resistance of the shaft end member 40 may be improved.

The steps after the diffusion bonding process are the same as the steps described in connection with the first representative method. FIG. 3(C) shows the engine valve 10 that has been finished.

The second representative method may provide the same advantages as described in connection with the first representative method.

In addition, according to the second representative method, because the male joint portion 27 of the valve shaft 20 and the female joint portion 44 of the shaft end member 40 are fitted to each other with a predetermined interference, the male joint portion 27 and the female joint portion 44 may be pressed against each other by a predetermined pressing force in the fitted state. The valve shaft 20 and the shaft end member 40 fitted to each other in this way may then be heated within the vacuum furnace, so that the male joint portion 27 and the female joint portion 44 may be diffusion bonded to each other to thereby form the engine valve 10 together with the valve head 30. Although the shaft end member 40 is made of steel in the second representative method, the shaft end member 40 may be made of titanium-based material.

Further, the second representative embodiment is advantageous because an axial end surface 40b of the shaft end member 40 may have improved wear resistance. Thus, a locker arm or a lifter (not shown) of the engine may slidably contact the axial end surface 40b during the operation of the engine, the axial end surface 40b may have an improved durability.

A third representative method of manufacturing engine valves will now be described with reference to FIGS. 4(A) to 4(D). The third representative method is a modification of the second representative method. Therefore, like members are given the same reference numerals as the first and second representative embodiments and the description of these members will not be necessary.

The third representative method is different from the second representative method in that a shaft end member 40A that is a separate member from the valve shaft 20 may be friction bonded to the valve shaft 20 as shown in FIG. 4(A). After the shaft end member 40A has been bonded to the valve shaft 20, the lower portion of the valve shaft 20 may be cut as shown in FIG. 4(B) to have a predetermined length measured from a bonding surface A between the shaft end member 40A and the valve shaft 20. Therefore, the boding position between the valve shaft 20 and the shaft end member 40A may be accurately determined relative to the valve head 30. The other steps of the third representative embodiment are the same as the second representative embodiment. FIG. 4(C) shows the valve shaft 20 and the valve head 30 that have been fitted to each other. FIG. 4(D) shows the engine valve 10 that has been finished after the diffusion bonding process.

Also according to the third representative method, the same advantages as the second representative method can be attained.

A fourth representative method of manufacturing engine valves will now be described with reference to FIGS. 5(A) to 5(D). The fourth representative method is a modification of the first representative method. Therefore, like members are given the same reference numerals as the first representative embodiments and the description of these members will not be necessary.

Referring to FIG. 5(A), a valve shaft 20A may be formed by a cylindrical tube or a hollow material that is made of titanium alloy, e.g., Ti64, and has been cut to have a predetermined length.

A lower end of the valve shaft 20A may be configured as a convex joint portion or a male joint portion 24A and may be fitted into the female joint portion 34 of the valve head 30 with a predetermined interference as shown in FIG. 5(B). In addition, a shaft end member 40B that is made of material, e.g., Ti64, that can be diffusion bonded to the valve shaft 20 may be fitted into the upper end of the valve shaft 20 with a predetermined interference. Similar to the fitting between the male joint portion 34 of the valve head 30 and the female joint portion 24 of the valve shaft 20 in the first representative method, the shaft end member 30B may be interferentially fitted into the valve shaft 20A by a suitable fitting technique, such as a press fitting technique and a shrink or expansion fitting technique utilizing heat. In addition, prior to or after the fitting operation between the shaft end member 30B and the valve shaft 20A, the male joint portion 24A of the valve shaft 20A and the female joint portion 34 of the valve head 30 may be fitted to each other with a predetermined interference in the same manner as described in connection with the first representative method.

Then, in the same manner as described in connection with the first representative method, the valve shaft 20A, the valve head 30 and the shaft end member 30B may be heated within a vacuum furnace (not shown). As a result, the male joint portion 24A of the valve shaft 20A and the female joint portion 34 of the valve head 30 may be diffusion bonded to each other. At the same time, the upper end of the valve shaft 20A and the shaft end member 40B may be diffusion bonded to each other. In this representative embodiment, the valve shaft 20A and the shaft end member 40B are made of the same material (Ti64) with each other. However, the shaft end member 40B may be made of steel, e.g., SUH11.

Thereafter, a plug 39 made of titanium alloy, e.g., Ti64, may be secured within a hollow space 36 of the valve head 30 as shown in FIG. 5(C) by using a welding technique, e.g. a laser welding technique, so that the hollow space 36 may be sealed from the outside. Therefore, the hollow space 36 may not communicate with a combustion chamber of the engine when the engine valve 10 mounted to the engine. As a result, a compression ratio of an air-fuel mixture supplied to the combustion chamber may be prevented from being decreased.

The other steps are the same as the first representative method. FIG. 5(D) shows the engine valve 10 that has been finished.

Also according to the fourth representative method, the same advantages as the first representative method can be attained.

In addition, the engine valve 10 may be light-weight, because the valve shaft 20A has a hollow construction, so that the engine valve 10 can be advantageously used for increasing an output of the engine and for reducing the fuel consumption.

The present invention may not be limited to the above representative methods but may be modified in various ways without departing from the spirit of the present invention. For example, the present invention may be applied to methods of bonding any two different members other than parts of engine valves. In addition, the valve shaft 20(20A) and the valve head 30 may be made of different materials from each other as long as they can be diffusion bonded. Further, the steps after the diffusion bonding of parts of the engine valve 10 may be suitably modified.

Furthermore, the arrangement of the male joint portion 24(24A) of the valve shaft 20(20A) and the corresponding female joint portion 34 of the valve head 30 may be inverted to each other. Thus, a female joint portion may be formed on the valve shaft 20(20A) and a corresponding male joint portion may be formed on the valve head 30.

Similarly, the arrangement of the male joint portion 27 of the valve shaft 20 and the corresponding female joint portion 44 of the shaft end member 40 may be inverted to each other. Thus, a female joint portion may be formed on the valve shaft 20 and a corresponding male joint portion may be formed on the shaft end member 40.

Furthermore, the fitting operation with a predetermined interference between the valve shaft 20 and the valve head 30 may be performed in a different manner. FIGS. 6(A) and 6(B) show an alternative process of such a fitting operation. Referring to FIG. 6(A), a tapered hole 38 may be defined in a valve head 30A. The tapered hole 38 may have a diameter that increases in a downward direction as viewed in FIG. 6(A). A valve shaft 20B may be inserted into the tapered hole 38 in a direction from the lower side toward the upper side of the valve shaft 20B. The valve shaft 20B may have an enlarged lower end 28 that has an outer surface configured to substantially conform to the tapered hole 38, so that the lower end 28 of the valve shaft 20B may be fitted into the tapered hole 38 of the valve head 30A with a predetermined interference as shown in FIG. 6(B). The steps after the fitting operation may be the same as the first representative method. This alternative embodiment is advantageous because, the valve shaft 20B may be fitted into the valve head 30A such that the valve head 30A can be reliably prevented from being removed from the valve shaft 20B.

Although the present invention has been described in connection with methods of manufacturing engine valves, the present invention also may be applied to methods of manufacturing diffusion-bonded products other than engine valves. For example, the present invention also may be applied to methods of manufacturing locker arms that cooperate with engine valves. In order to manufacture a locker arm, a plurality of flat plates made of titanium-based materials may be superposed with each other. Pins may then be press-fitted into the superposed flat plates. Thereafter, the superposed flat plates and the pins may be diffusion bonded together in the same manner as described in connection with the above representative embodiments, so that the locker arm can be manufactured.

What is claimed is:

1. A method of diffusion bonding a first member and a second member to each other, comprising:
   providing a first joint portion and a second joint portion on the first member and the second member, respectively,
   fitting the first and second joint portions to each other with a predetermined interference, such that the first and second joint portions press against each other with a predetermined pressing force in a fitted state, and
   thereafter heating the first and second members under a condition substantially without oxygen, and without applying any additional force to the first and second joint portions, so that the first and second joint portions are diffusion bonded to each other.

2. A method as in claim 1, wherein at least one of the first and second members is made of titanium-based material, and the first and second members are heated within a vacuum furnace.

3. A method as in claim 2, wherein the titanium-based material is titanium alloy.

4. A method as in claim 1, wherein the materials of the first and second members are chosen from a group consisting of titanium alloy, steel and ceramic.

5. A method as in claim 1, wherein the fist and second joint portions comprise a convex joint portion and a concave portion, respectively.

6. A method as in claim 5, wherein the first and second joint portions are fitted to each other by press fitting.

7. A method as in claim 5, wherein the first and second joint portions are fitted to each other by a shrink fitting utilizing heat.

8. A method as in claim 5, wherein the fist and second joint portions are fitted to each other by an expansion fitting utilizing heat.

9. A method as in claim 5, wherein the first and second joint portions comprise a tapered hole and a projection that has a configuration conforming to the tapered hole, respectively.

10. A method of manufacturing an engine valve, wherein the engine valve includes a valve shaft and a valve head, comprising:
    providing a first joint portion and second joint portion on the valve shaft and the valve head, respectively,
    fitting the first and second joint portions to each other with a predetermined interference; and
    thereafter heating the valve shaft and the valve head under a condition substantially without oxygen, so that the first and second joint portions are diffusion bonded to each other.

11. A method as in claim 10, wherein at least one of the valve shaft and the valve head is made of titanium-based material, and the valve shaft and the valve head are heated within a vacuum furnace.

12. A method as in claim 11, wherein the titanium-based material is titanium alloy.

13. A method as in claim 10, wherein the materials of the valve shaft and the valve head are chosen from a group consisting of titanium alloy, steel and ceramic.

14. A method as in claim 10, wherein one of the first and second joint portions comprises a convex portion and the other of the first and second joint portions comprises a concave portion.

15. A method as in claim 14, wherein the first and second joint portions are fitted to each other by a press fitting.

16. A method as in claim 14, wherein the first and second joint portions are fitted to each other by a shrink fitting utilizing heat.

17. A method as in claim 14, wherein the first and second joint portions are fitted to each other by an expansion fitting utilizing heat.

18. A method as in claim 14, wherein one of the first and second joint portions comprises a tapered hole and the other of the first and second portions comprises a projection that has a configuration conforming to the tapered hole.

19. A method as in claim 10, wherein the valve shaft has a tubular configuration.

20. A method as in claim 10, wherein the engine valve further includes a shaft end member.

21. A method as in claim 20, further including:
    providing a third joint portion and a fourth joint portion on the valve shaft and the shaft end portion, respectively, wherein the first joint portion and the third joint portion are disposed opposite to each other; and
    joining the third and fourth joint portions to each other.

22. A method as in claim 21, wherein the third and fourth joint portions are diffusion bonded to each other at the same time that the first and second joint portions are diffusion bonded to each other.

23. A method as in claim 21, wherein the materials of the valve shaft, the valve head and the shaft end member are chosen from a group consisting of titanium alloy, steel and ceramic.

24. A method as in claim 21, wherein the third and fourth joint portions are friction bonded to each other.

25. A method of manufacturing an engine valve, wherein the engine valve includes a valve shaft and a shaft end member, comprising:

providing joint portions on the valve shaft and the shaft end member, respectively, fitting the joint portions to each other with a predetermined interference, such that the first and second joint portions press against each other with a predetermined pressing force in a fitted state; and thereafter heating the valve shaft and the shaft end member under a condition substantially without oxygen, and without applying any additional force to the first and second joint portions, so that the joint portions are diffusion bonded to each other.

26. A method as in claim 25, wherein at least one of the valve shaft and the shaft end member is made of titanium-based material, and the valve shaft and the shaft end member are heated within a vacuum furnace.

27. A method as in claim 25, further including cutting the valve shaft to a predetermined length with reference to a joint point between the valve shaft and the shaft end portion.

* * * * *